(12) United States Patent
Brinker et al.

(10) Patent No.: US 10,306,898 B2
(45) Date of Patent: Jun. 4, 2019

(54) YEAST-LEAVENED DOUGH AND DRY MIX FOR PREPARING SUCH A DOUGH

(75) Inventors: Eva-Maria Brinker, Rheine (DE); Kerstin Schmidt, Bremen (DE)

(73) Assignee: CARAVAN INGREDIENTS INC., Lenexa, KS (US)

(*) Notice: Subject to any disclaimer, the term of this patent is extended or adjusted under 35 U.S.C. 154(b) by 762 days.

(21) Appl. No.: 12/597,713

(22) PCT Filed: Apr. 25, 2008

(86) PCT No.: PCT/NL2008/050251
§ 371 (c)(1),
(2), (4) Date: Jan. 19, 2010

(87) PCT Pub. No.: WO2008/133512
PCT Pub. Date: Nov. 6, 2008

(65) Prior Publication Data
US 2010/0143534 A1 Jun. 10, 2010

(30) Foreign Application Priority Data
Apr. 26, 2007 (EP) .................................... 07107023

(51) Int. Cl.
| | | |
|---|---|---|
| *A21D 8/02* | (2006.01) |
| *A21D 10/00* | (2006.01) |
| *A21D 2/18* | (2006.01) |
| *A21D 2/22* | (2006.01) |
| *A21D 8/04* | (2006.01) |
| *A21D 10/02* | (2006.01) |

(52) U.S. Cl.
CPC ........... *A21D 10/005* (2013.01); *A21D 2/181* (2013.01); *A21D 2/22* (2013.01); *A21D 8/042* (2013.01); *A21D 10/02* (2013.01)

(58) Field of Classification Search
USPC .................................... 426/62, 549
See application file for complete search history.

(56) References Cited

U.S. PATENT DOCUMENTS

| | | | |
|---|---|---|---|
| 4,233,321 A | 11/1980 | Zenner et al. | |
| 4,481,222 A | 11/1984 | Fan | |
| 5,059,432 A | 10/1991 | Berkowitz et al. | |
| 5,385,742 A * | 1/1995 | Van Eijk | A21D 8/04 426/19 |
| 5,804,242 A | 9/1998 | Wallin | |
| 7,815,952 B2 * | 10/2010 | Inoue et al. | 426/62 |
| 2001/0053401 A1 * | 12/2001 | Lanner | A21D 2/16 426/94 |
| 2004/0219141 A1 | 11/2004 | Kashimura et al. | |
| 2005/0112272 A1 | 5/2005 | Kao et al. | |
| 2005/0222406 A1 | 10/2005 | Haji Begli et al. | |
| 2007/0092602 A1 * | 4/2007 | Degre | A21D 2/16 426/20 |

FOREIGN PATENT DOCUMENTS

| | | |
|---|---|---|
| DE | 102 42 062 | 3/2004 |
| EP | 0 688 501 | 12/1995 |
| EP | 0 919 131 | 6/1999 |
| FR | 2 683 123 | 5/1993 |
| GB | 1 587 296 | 4/1981 |
| WO | 02/26044 | 4/2002 |

OTHER PUBLICATIONS

International Search Report dated Jul. 14, 2008, from corresponding PCT application.

* cited by examiner

*Primary Examiner* — Lien T Tran
(74) *Attorney, Agent, or Firm* — Young & Thompson

(57) ABSTRACT

A dry particulate mix for use in yeast leavened bakery products, includes:
- 3-90 wt. % of non-fermentable carbohydrates, including at least 3 wt. % of a non-fermentable sugar alcohol;
- 0-50 wt. % of fermentable sugars;
- two or more bakery ingredients selected from the group consisting of:
  - 10-90 wt. % of viable yeast;
  - 10-50 wt. % of baking powder;
  - 5-90 wt. % of emulsifier;
  - 3-50 wt. % of ascorbic acid; and
  - 0.0001-1 wt. % of bakery enzyme;

all of these percentages being calculated on the combined amount of these two to five bakery ingredients; and wherein the weight ratio of non-fermentable carbohydrates to fermentable sugars exceeds 1:1. A sweetened dough is obtainable by incorporating therein 3-75% by weight of the final dough of the dry particulate mix.

12 Claims, No Drawings

YEAST-LEAVENED DOUGH AND DRY MIX FOR PREPARING SUCH A DOUGH

TECHNICAL FIELD OF THE INVENTION

The present invention provides a yeast-leavened sweetened dough exhibiting improved proofing tolerance. More particularly, the present invention relates to a fully proofed sweetened dough that is stable against overproofing, i.e. that can be stored for up to several hours without the occurrence of dough collapse. The proofing tolerant sweetened dough according to the present invention contains non-fermentable carbohydrates, including a non-fermentable sugar alcohol.

The invention also relates to a dry particulate mix that can advantageously be used to prepare a proof stable sweetened dough and that contains 3-90 wt. % of non-fermentable carbohydrates, including at least 3 wt. % of a non-fermentable sugar alcohol.

BACKGROUND OF THE INVENTION

Traditionally, leavened dough is prepared by adding live yeast (baker's yeast) to the dough and by proofing the dough prior to baking. Proofing usually refers to a process by which pieces of yeast dough shaped to form bakery products are raised or enlarged preparatory to their being baked. Thus pastries, rolls, breads and other bakery products must undergo proofing before being put in an oven to be baked. When dough intermixed with live yeast is placed in a warm moist environment, carbon dioxide is internally generated throughout the body of the dough to create myriad gas pockets. These gas pockets enlarge or raise the dough and also alter its texture.

When the proofed dough is baked, the resultant product is lighter and less chewy than dough products which are not raised prior to baking. Thus croissants, doughnuts, pan pizzas, rolls and breads must be properly proofed before being baked. Proofing therefore is the process by which the shaped yeast dough pieces are subjected to a moist, hot-air environment to raise the pieces, and a proofing cabinet is a chamber in which proofing takes place.

The atmosphere in which proofing of yeast dough takes place within a cabinet needs to be controlled carefully to avoid underproofing or overproofing. Should the dough pieces receive excessive heat, they will rise too fast, thereby producing large gas pockets that cause the pieces to collapse during baking. On the other hand, insufficient heat results in dough pieces that are not fully raised, and when these pieces are baked they will have an undesirably dense structure. Excessive moisture in proofing causes the product to have a mushy surface, while insufficient moisture renders the surface of the baked product tough and rubbery.

Properly proofed yeast dough pieces must be handled with great care as they are very vulnerable. Fully proofed yeast dough will quickly collapse due to overproofing. Overproofing results from the continued activity of the live yeast, resulting in excessive carbon dioxide production and weakening of the dough structure. In order to avoid the occurrence of overproofing proofed yeast dough pieces have to be baked shortly after proofing or they have to be stored under refrigerated conditions until baking.

Overproofing is particularly difficult to avoid in yeast leavened dough containing added sugars such as sucrose, glucose and/or fructose, as these sugars provide an excellent nutrient source as well as a carbon source for the production of carbon dioxide.

The use of non-fermentable sugar alcohols in bakery applications is known in the art. WO 02/26044, for instance, describes liquid bread improving compositions comprising one or more enzymes, ascorbic acid and one or more polyols (including sorbitol). It is observed in WO 02/26044 that, when present in high amounts in aqueous solutions, polyols lower the water activity to such an extent that processes which inactivate enzymes and degrade ascorbic acid and microbial infections are slowed down. This is said to be of particular advantage for the liquid bread improving compositions described in the international patent application as these ideally need a long shelf life (up to 6 months).

US 2005/0112272 describes functional bulking agents for use in baked goods, the bulking agent comprising:
at least one starch hydrolysis product which is indigestible or resistant to digestion;
at least on bulk sweetener (e.g. sugar alcohol); and
at least one emulsifying agent.

Table 1 of US 2005/0112272 describes dry mixes for baked products comprising sorbitol (14.2-33 wt. %) as well as baking powder (1.5 wt. %) and emulsifier (4.6-4.7 wt. %). The bulking agents described in the US patent application serve as a direct, one-to-one, replacement of sugar in baked products. In particular, the bulking agent is said to be very useful in the preparation of a sugar-free sponge cake.

The use of non-fermentable sugars in bakery applications is described in, for example, EP-A 0 919 131. Example 1 of this European patent application describes a granular baking product containing, amongst other things, dextrose, lactose, baking powder, emulsifier, ascorbic acid and enzyme (amylase and xylanase). In the application lactose is mentioned together with saccharose, glucose, fructose, dextrin, maltodextrin and sugar alcohols as an example of a carbohydrates that can be included in the granular baking products described therein.

U.S. Pat. No. 4,233,321 describes the preparation of white bread by combining all dry ingredients (flour, emulsifier, salt, non fat dry milk, sucrose, shortening and lactose), dissolving yeast in water, adding the yeast slurry to the dry ingredients, mixing, fermenting, dividing and rounding, proofing, moulding, proofing and baking. In the US patent it is stated that lactose is used to replace sugar and fat in dough formulations to obtain white pan bread and rolls characterised by significantly improved tenderness or "freshness" as represented by shelf lives at least 50 to 100% longer than normally obtained with the standard formulations.

SUMMARY OF THE INVENTION

The inventors have discovered that the proofing stability of yeast leavened sweetened dough can be improved substantially by using non-fermentable carbohydrates, i.e. non-fermentable sugar alcohols and optionally non-fermentable sugars, to sweeten the dough.

Although the inventors do not wish to be bound by theory, it is believed that the fermentable sugars (e.g. sucrose, dextrose or invert sugar) found in ordinary sweetened dough provide yeast cells with a readily accessible and essentially inexhaustible nutrient source. Thus, during proofing of ordinary sweetened dough, carbon dioxide production usually occurs at a very high rate and continues at the same high rate until dough collapse.

By using non-fermentable carbohydrates instead of fermentable sugars to sweeten the dough, the rate of carbon dioxide production may be reduced, thus widening the time window within which the fully proofed dough can be handled without risking dough collapse. Furthermore, and even more importantly, it was unexpectedly found that in case non-fermentable carbohydrates are used instead of fermentable sugar, carbon dioxide production will not continue in an unimpeded fashion. Instead, carbon dioxide production will decrease after a certain time, possibly because by that time the fermentable sugars naturally present in the flour have been digested by the yeast.

The latter finding is truly unexpected as it is well-known that after depletion of the glucose and fructose naturally contained in flour, yeast fermentation is sustained by the action of α- and β-amylases (added or naturally present flour), which enzymes convert damaged starch granules into the fermentable sugar maltose.

One aspect of the present invention concerns a dry mix for use in yeast leavened sweetened bakery products, said dry mix containing non-fermentable carbohydrates, including non-fermentable sugar alcohols, and at least two bakery ingredients selected from the group of viable yeast, baking powder, emulsifier, ascorbic acid and bakery enzyme.

Another aspect of the invention relates to a sweetened dough that, besides flour, water and optional bakery ingredients, contains viable yeast and non-fermentable carbohydrates and that can be obtained by incorporating the aforementioned dry mix into the dough.

DETAILED DESCRIPTION OF THE INVENTION

Accordingly, one aspect of the invention relates to a dry particulate mix for use in yeast leavened bakery products, said mix comprising:
3-90 wt. % of non-fermentable carbohydrates selected from the group consisting of lactose, arabinose, cellobiose, trehalose, xylose, sugar alcohols and combinations thereof, including at least 3 wt. % of a non-fermentable sugar alcohol;
0-50 wt. % of fermentable sugars selected from the group consisting of sucrose, maltose, glucose, fructose and combinations thereof;
two or more bakery ingredients selected from the group consisting of:
 10-90 wt. % of viable yeast;
 10-50 wt. % of baking powder;
 5-90 wt. % of emulsifier;
 3-50 wt. % of ascorbic acid; and
 0.0001-1 wt. % of bakery enzyme;
all of these percentages being calculated on the combined amount of these two to five bakery ingredients; and
wherein the weight ratio of non-fermentable carbohydrates to fermentable sugars exceeds 1:1.

Since the weight percentages of the aforementioned bakery ingredients are calculated on the combined amount these same bakery ingredients, these percentages are not affected by the presence of other ingredients than those specified. An examples of a non-specified ingredient that may suitably be employed in the present dry mix is flour.

The term "non-fermentable carbohydrate", unless indicated otherwise, is used herein to refer to carbohydrates that cannot readily be digested by ordinary yeast, notably ordinary baker's yeast (*S. cerevisiae*).

The term "fermentable sugar" refers to sugars that are readily digested by ordinary yeast, notably ordinary baker's yeast (*S. cerevisiae*).

The term "leavened dough" as used herein refers to dough that has undergone a leavening process resulting in the formation of gas filled pockets throughout the dough. Freshly leavened doughs are characterised by the presence of elevated carbon dioxide levels in the gas filled pockets.

The term "sweetened dough" refers to a dough that contains added sweetener, e.g. a fermentable sugar such as sucrose, a non-fermentable sugar such as lactose and/or a sugar alcohol such as sorbitol. The present dough may also contains artificial sweeteners other than sugar alcohols, provided these sweeteners are bake-stable.

The term "sweetener" as used herein refers to an edible ingredient that can be added to foodstuffs to impart sweetness. Thus the term "sweetener" encompasses, for instance, sugar sweeteners as well as artificial sweeteners.

The dry mix of the present invention may suitably contain additional bakery ingredients besides the two or more bakery ingredients selected from yeast, baking powder, emulsifier and bakery enzyme. The dry mix may, for example contain flour. In case the amount of flour is sufficiently high, the dry mix can be used to prepare a dough by simply adding water and/or milk.

The benefits of the present inventions are particularly pronounced in case the dry particulate mix contains a considerable amount of non-fermentable sugars. Preferably, the present dry mix contains at least 3 wt. %, more preferably at least 5 wt. % of non-fermentable sugars selected from the group consisting of lactose, arabinose, cellobiose, trehalose, xylose and combinations thereof.

According to a particularly preferred embodiment, the dry mix contains at least 1 wt. % of, more preferably at least 3 wt. % and most preferably at least 5 wt. % of non-fermentable reducing sugars, such as lactose. Reducing sugars are advantageously incorporated in the dry mix as these sugars, unlike non-reducing sugars, are capable of reacting with protein amino groups to initiate a process called non-enzymatic browning. Thus, by incorporating non-fermentable reducing sugars in the present dry mix, said dry mix can advantageously be used in the preparation of dough products that will exhibit pronounced surface browning during baking.

According to a particularly preferred embodiment, the present dry mix contains both a non-fermentable sugar and a non-fermentable sugar alcohol. Even more preferably, the present dry mix contains 3-90 wt. % of non-fermentable sugar and 3-50 wt. % of non-fermentable sugar alcohol. The combined use of non-fermentable sugar and non-fermentable sugar alcohol offers the advantage that a baked product combining optimum sweetness with optimum browning can be obtained.

Examples of sugar alcohols that may suitably be employed in accordance with the present invention include sorbitol, xylityol, lactitol, isomalt, maltitol, mannitol, erythritol, inositol, hydrogenated isomaltulose, hydrogenated starch hydrolysates and combinations thereof. Preferably, the sugar alcohol employed is selected from the group consisting of sorbitol, xylityol, lactitol, isomalt, maltitol, mannitol and combinations thereof.

The present dry mix advantageously contains 10-90%, preferably 15-80% of yeast by weight of the two to five bakery ingredients mentioned herein before (yeast, baking powder, emulsifier, ascorbic acid and enzymes). Expressed differently, the dry mix advantageously contains at least $10^6$ yeast cells, preferably at least $10^7$ yeast cells and most preferably at least $10^8$ yeast cell per gram.

Very high proofing tolerance can be achieved if the yeast employed in accordance with the present invention is *S. bayanus*.

The inventors have achieved particularly good results with a *S. bayanus* strains exhibiting killer characteristics, i.e.

strains that produce toxins that are fatal to other yeast strains. The phenomena of killer yeasts were discovered in 1965. Killer yeasts produce toxins as either proteins or glycoproteins, and these toxins are fatal to other yeast strains. Not all yeast strains are sensitive to killer toxins, and yeasts are currently classified as killer strains, sensitive strains, unaffected strains and competitive yeast strains. The sensitive yeast strains cannot survive when significant quantities of killer toxins are present in the must. The insensitive strains are affected by the presence of killer toxins. Competitive yeast strains are not killer strains, and they are insensitive to killer toxins. Toxicity is measured observing the inhibition of growth of one yeast strain in the presence of another strain. Research shows the killer toxins are more effective at pH values between 4 and 5. Several killer yeast strains are available commercially in active, dry form. In a particularly preferred embodiment of the present invention, the *S. bayanus* strain employed is a killer yeast *S. cerevisiae* Killer (ssp. *bayanus*) deposited as IOC 18-2007 in the Collection de Levure d'Intérêt Biotechnologique and sold by Institut Oenologique de Champagne under the product code "IOC 18-2007".

According to another preferred embodiment, the *S. bayanus* strain employed is an *S. bayanus* strain deposited as IOC 11-1002 in the Collection de Levure d'Intérêt Biotechnologique. This particular strain is commercially available from the Institut Oenologique de Champagne, Epernay, France and is designated on the product sheet as *Saccharomyces cerevisiae* (anc. *Saccharomyces bayanus*). On the product sheet the strain is described as having a high resistance to alcohol (>15 vol. %). It is further characterised as having a high alcohol conversion (16.5 g/l of sugar produces 1% of alcohol).

According to another preferred embodiment, the present dry mix contains 0.0001-1%, preferably 0.0003-0.5% by weight of the two to five bakery ingredients of a bakery enzyme selected from the group consisting of α-amylase, xylanase, glucose oxidase, hemicellulase, cellulose and combinations thereof. The aforementioned percentages exclusively refer to the amount of enzyme contained in the dry mix. In other words, non enzymatic components of enzymatic preparations, such as carriers, are disregarded in this respect.

The dry particulate mix according to the invention may take the form of a powder, a pourable liquid or a paste. Most preferably, the dry mix is a free flowing powder with a volume weighted mean diameter in the range of 50-1000 μm.

Another aspect of the invention relates to the use of a dry particulate mix as defined herein before in the preparation of a proofing tolerant yeast-leavened dough. Typically, such use includes the incorporation of 3-75% of the dry particulate mix by weight of the final dough. Preferably, the dry mix is incorporated in an amount of 10-65% by weight of the final dough.

Yet another aspect of the invention relates to a sweetened dough comprising:
  40-80 wt. % of flour;
  25-50 wt. % of water;
  3-25 wt. % of non-fermentable carbohydrates selected from the group consisting of lactose, arabinose, cellobiose, trehalose, xylose, sugar alcohols and combinations thereof;
  0-10 wt. % of fermentable sugars selected from the group consisting of sucrose, glucose, fructose and combinations thereof; and
  0.5-5 wt. % of yeast;

wherein the dough is obtainable by incorporating therein 3-75% by weight of the final dough of the dry particulate mix defined herein before.

The benefits of the present inventions are particularly evident in dough products having a pronounced sweet taste. Thus, in a preferred embodiment, the sweetened dough of the present invention has a sweetness that is equivalent to a dough containing at least 4% sucrose by weight of flour, especially 5-20% sucrose by weight of flour and most preferably 8-20% sucrose by weight of flour.

The sweetened dough according to the present invention advantageously contains non-fermentable carbohydrates and (optional) fermentable sugars in a weight ratio of at least 1:1, more preferably of at least 3:2 and most preferably of at least 2:1.

According to yet another preferred embodiment, the present sweetened dough contains at least 5% non-fermentable carbohydrate by weight of flour and less than 5% of fermentable sugar by weight of flour.

As explained herein before, particularly beneficial results can be obtained if the dough is leavened with the help of *S. bayanus*. Hence, according to a preferred embodiment, the present dough contains 0.5-5 wt. % of *S. bayanus*.

Examples of a sweetened dough according to the present invention include doughs for the preparation of a bakery product selected from the group consisting of pastry (including Danish pastry), croissant, doughnut (ring as well as ball doughnut), brioche, sweet buns, panettone and Stollen. The term "doughnut" encompasses any baked dough product that is traditionally prepared by frying, e.g. Berliners.

A further aspect of the invention relates to a process of preparing a proofing tolerant, yeast-leavened dough, said process comprising the steps of combining a dry particulate mix as defined herein before with an aqueous composition and optionally other bakery ingredients to form a sweetened dough as defined herein before, followed by proofing the dough so as to obtain the proofing tolerant yeast-leavened dough.

In a preferred embodiment, the dough is proofed at a temperature in the range of 15-45° C., typically at a relative humidity (RH) of at least 60%, to obtain a proofed dough. Typically, in the present process the proofing tolerant dough obtained in the process has a specific volume of at least 1.4 ml per gram.

The advantages of the present invention are particularly apparent in a yeast-leavened sweetened dough that is fully proofed. The term "fully proofed" as used herein refers to a dough that has been leavened to maximum capacity under the proofing conditions employed. After reaching the "fully proofed" stage, there is generally a time window of not more than several minutes (depending on product, size, recipe) for the dough to be baked. Otherwise, dough collapse is inevitable. Dough collapse may be avoided by cooling or freezing the pre-proofed dough, but this usually needs to be done at around ⅔ of the proofing time needed to achieve a fully proofed dough.

Ordinarily, proofing times employed in the present method are within the range of 30-120 minutes. Preferably, proofing time is within the range of 40-100 minutes, more preferably within the range of 60-90 minutes. In a particularly preferred embodiment, the dough is proofed at a temperature of at least 15° C., more preferably of at least 28° C., most preferably of a least 35° C. Usually, proofing temperature does not exceed 45° C. Proofing is typically carried out at a relative humidity of at least 70%, preferably of at least 75%.

In accordance with the present invention yeast is advantageously incorporated in the dough in a concentration of at least $10^5$ cells per g of dough. Preferably, yeast is incorporated in the dough in a concentration of $5\times10^5$-$10^{10}$, more preferably of $5\times10^6$-$5\times10^9$ cells per g of dough.

The present invention encompasses the use of yeast in combination with other leavening agents, e.g. acid/base leavening systems. According to a particularly preferred embodiment at least 50%, preferably at least 70% and even more preferably at least 80% of the viable yeast cells contained in the yeast belong to S. bayanus. Most preferably, all of the viable yeast cells employed in the present method belong to S. bayanus. In another preferred embodiment, the present method does not employ an acid/base (or chemical) leavening system.

In another preferred embodiment of the invention, the dough is shaped prior to proofing. The term "shaping" refers to the manual or mechanical moulding of dough pieces into the desired shape.

The present method offers the advantage that it can suitably employ a resting period of up to 30 minutes prior to the shaping of the dough. Indeed, in a preferred embodiment of the invention, the present method employs a resting period of between 1 and 30 minutes, preferably of between 2 and 20 minutes, prior to shaping.

Finally, the present invention also provides a method of preparing a baked or fried product from a proofing tolerant, yeast-leavened dough, said method comprising the process of preparing proofing tolerant, yeast-leavened dough as defined herein before, followed by baking or frying the proofed dough. According to a particularly preferred embodiment, the proofed dough is stored for more than 30 minutes prior to baking or frying.

The inventors have discovered that the leavened dough obtained in the present method is surprisingly stable, i.e. prior to baking or frying it can be stored for several hours under proofing or ambient conditions, without the risk of e.g. dough collapse. Also, the leavened dough does not need to be stored under refrigerated conditions if it cannot be baked or fried immediately. This advantages of the present method are particularly manifest if prior to baking or frying the leavened dough is kept for more than 30 minutes at a temperature of at least 15° C., especially under ambient conditions (usually 20-25° C.). This may, for instance, occur in case of line breakdown or if baking and dough production takes place at different locations.

In a particularly preferred embodiment, the leavened dough is stored under ambient conditions for more than 1 hour, even more preferably for more than 2 hours, especially for more than 4 hours and most preferably for more than 6 hours prior to baking or frying. Typically, the leavened dough is stored under ambient conditions for not more than 24 hours, preferably for not more than 16 hours prior to baking or frying.

In one particular embodiment of the invention, the leavened dough is baked after it has been stored under ambient conditions, without said leavened dough having been stored or transported under refrigerated or freezing conditions. It is known that dough collapse of especially yeast leavened doughs may be prevented or postponed by refrigerating or freezing the leavened dough, provided refrigeration or freezing occurs well before the dough is fully proofed. The present leavened dough offers the advantage that it will remain stable without the need of employing refrigerated or freezing conditions, even if said dough has been fully proofed.

The stability of the leavened dough is not only manifest in the dough product obtained directly after proofing. Indeed, the present leavened dough may advantageously be stored and/or transported under refrigerated or freezing conditions, following which the leavened dough can suitably be stored under ambient conditions for at least 30 minutes prior to baking or frying. Also after frozen or refrigerated storage, the present dough retains its stability and does not suffer from e.g. dough collapse.

Accordingly, in a particularly preferred embodiment of the present method, prior to baking or frying, the leavened dough is successively packaged, frozen and stored frozen. It is noted that the dough need not be fully proofed prior to freezing. As a matter of fact, it is preferred to partially proof the dough prior to freezing. Prior to baking or frying, the frozen leavened dough is thawed and kept under ambient or proofing conditions for at least 30 minutes, more preferably for at least 1 hour and even more preferably for at least 2 hours.

This particular embodiment of the invention offers the advantage that the leavened dough may be produced in a dedicated professional bakery, whereas the baked or fried product can be produced from the leavened dough in a different location with much less skilled personnel. Storage and/or transportation under refrigerated or freezing conditions offers the advantage that the time period between leavened dough manufacture and baking can be varied considerably. In addition, the stability of the leavened dough under ambient or proofing conditions offers the important additional advantage that even when the pre-leavened dough has been removed from the freezer or refrigerator, it will be stable for several more hours. Thus, following thawing of the frozen leavened dough, high quality, freshly baked products may be produced therefrom on demand for up to 8 hours or more after thawing.

Baked products of excellent quality can be obtained by the present method by baking the leavened dough in an oven that was previously preheated to a temperature of at least 160° C., preferably of at least 200° C. Likewise, excellent products can be obtained by (deep) frying the dough in a frying medium having a temperature of at least 150° C.

In a preferred embodiment of the invention, the preparation of the leavened dough and the baking/frying operation are carried out in a different locations. The present invention offers the advantage that it enables the preparation of a storage stable dough that can be stored and transported under ambient conditions. Thus, in a particularly preferred embodiment, the method of the present invention comprises the steps of mixing, forming, shaping, proofing and packaging the dough in one location, followed by transporting the dough by means of a motorized vehicle (e.g. a truck) to another location where the dough is baked. Thus, the present invention makes it possible to prepare freshly baked products anywhere an oven is available and without the need of refrigerated/frozen storage or transportation.

The benefits of the present invention can be realised without the need of using a preferment. Thus, in a preferred embodiment of the present method dough preparation does not comprise the use of a preferment, in particular it does not comprise the use of liquid preferment.

The invention is further illustrated by means of the following example.

EXAMPLE

Sweet rolls were prepared on the basis of the following recipes:

|  | Recipe 1 | Recipe 2 | Recipe 3 |
|---|---|---|---|
| Wheat flour (Roland-type 550) | 2000 g | 2000 g | 2000 g |
| Milk (8° C.) | 1120 g | 1220 g | 1220 g |
| Fat [1] | 200 g | 200 g | 200 g |
| Saccharose | 160 g |  |  |
| Isomalt |  | 240 g | 200 g |
| Lactose |  |  | 40 g |
| Baking improver [2] |  | 40 g | 40 g |
| Salt | 40 g | 30 g | 30 g |
| Fresh yeast [3] | 120 g |  |  |
| Dry yeast IOC 18-2007 [4] |  | 60 g | 60 g |

[1] Goldback ® (Meistermarken, Germany)
[2] Goldmalz ® (BIB Ulmer Spatz, Germany)
[3] Backhefe ™ (Uniferm, Germany)
[4] A yeast strain ex Institut Oenologique de Champagne, Epernay, France; designated in the product sheet as *S. cerevisiae* Killer (anc. *bayanus*)

The dough ingredients were admixed in Diosna™ SP 15 Spiral mixer and kneaded for 2 (slow)+7 (fast) minutes (dough temperature after kneading appr. 26° C.). A dough mass of 1700 grams was allowed to rest for 15 minutes before it was divided into pieces of about 56 grams. Following another resting period of about 5 minutes, the dough pieces were proofed at 35° C. and a relative humidity of 75% for 1-6 hours. After proofing, samples were immediately transferred into a pre-heated oven and baked for 16 minutes at 185° C. using repeated steam injections (1.01).

The specific volume (SV) of the baked dough pieces was determined as well as the change of SV as a function of proofing time. This was done by determining the combined weight and volume of 5 baked products that were obtained from the same proofing batch. The following results were obtained:

TABLE 1

|  | Recipe 1 | | Recipe 2 | | Recipe 3 | |
|---|---|---|---|---|---|---|
|  | SV | Change | SV | Change | SV | Change |
| 1 hour | 4.5 ml/g |  | 3.7 |  | 3.9 |  |
| 2 hours | 4.1 ml/g | −9% | 4.1 | +11% | 4.3 | +10% |
| 3 hours | 3.9 ml/g | −13% | 4.1 | +11% | 4.5 | +15% |
| 4 hours | 3.7 ml/g | −18% | 4.2 | +14% | 4.4 | +13% |
| 5 hours | 3.7 ml/g | −18% | 4.3 | +16% | 4.3 | +10% |
| 6 hours | 3.9 ml/g | −13% | 3.9 | +5% | 4.2 | +8% |

The strong decrease in volume observed for the baked products made according to recipe 1 was already evident in the proofed dough pieces, which clearly shows that the loss in volume was caused by dough collapse. No such dough collapse was observed in the baked products made according to recipe 2 or 3.

After baking, the rolls prepared according to recipes 1 and 3 showed clear surface browning, whereas the surface of the rolls prepared according to recipe 2 was slightly pale.

The invention claimed is:

1. A process of preparing a yeast-leavened sweetened dough using non-fermentable carbohydrates instead of fermentable sugars, said dough having a sweetness that is equivalent to the sweetness of a dough containing 5-20% sucrose by weight of flour, said yeast-leavened sweetened dough comprising:
    40-80 wt % of flour;
    25-50 wt % of water;
    3-25 wt % of nonfermentable carbohydrates selected from the group consisting of lactose, arabinose, cellobiose, trehalose, xylose, sugar alcohols and combinations thereof;
    and
    0.5-5 wt. % of yeast;
said process comprising the steps of combining a dry particulate mix with an aqueous composition and optionally other bakery ingredients to form a flour- and yeast-containing dough, followed by proofing the dough so as to obtain the yeast-leavened dough, said mix comprising:
up to 90 wt. % of non-fermentable carbohydrates selected from the group consisting of lactose, arabinose, cellobiose, trehalose, xylose, sugar alcohols and combinations thereof, including at least 3 wt. % of a non-fermentable sugar alcohol and at least 3 wt. % of non-fermentable reducing sugars selected from the group consisting of lactose, arabinose, cellobiose, xylose and combinations thereof, the non-fermentable carbohydrates being added instead of fermentable sugars to obtain the yeast-leavened dough; and
two or more bakery ingredients selected from the group consisting of:
10-90 wt. % of viable yeast;
10-50 wt. % of baking powder;
5-90 wt. % of emulsifier;
3-50 wt. % of ascorbic acid; and
0.0001-1 wt. % of bakery enzyme;
all of these percentages being calculated on the combined amount of these two to five bakery ingredients.

2. The process according to claim 1, wherein the non-fermentable sugar is lactose.

3. The process according to claim 1, wherein the sugar alcohols are selected from the group consisting of sorbitol, xylityol, lactitol, isomalt, maltitol, mannitol, erythritol, inositol, hydrogenated isomaltulose, hydrogenated starch hydrolysates and combinations thereof.

4. The process according to claim 3, wherein the sugar alcohols are selected from the group consisting of sorbitol, xylityol, lactitol, isomalt, maltitol, mannitol and combinations thereof.

5. The process according to claim 1, wherein the mix contains 10-90% of yeast by weight of the two to five bakery ingredients.

6. The process according to claim 5, wherein the yeast is *S. bayanus*.

7. The process according to claim 1, wherein the mix contains 0.0001-1% by weight of the two to five bakery ingredients of a bakery enzyme selected from the group consisting of α-amylase, xylanase, glucose oxidase, hemicellulase, cellulose and combinations thereof.

8. The process according to claim 1, wherein the proofing tolerant dough obtained in the process has a specific volume of at least 1.4 ml per gram.

9. A sweetened, yeast-leavened dough that is obtained by the process according to claim 1, wherein the dough comprises 3-75% of said dry particulate mix.

10. The sweetened dough according to claim 9, wherein the yeast is *S. bayanus*.

11. The sweetened dough according to claim 9, wherein the dough is a dough for the preparation of a bakery product selected from the group consisting of croissant, doughnut, brioche, sweet buns, panettone and Stollen.

12. A method of preparing a baked or fried product from a yeast-leavened dough, said method comprising the process of preparing yeast-leavened dough according to claim 1, followed by baking or frying the proofed dough.

* * * * *